Figure 1:
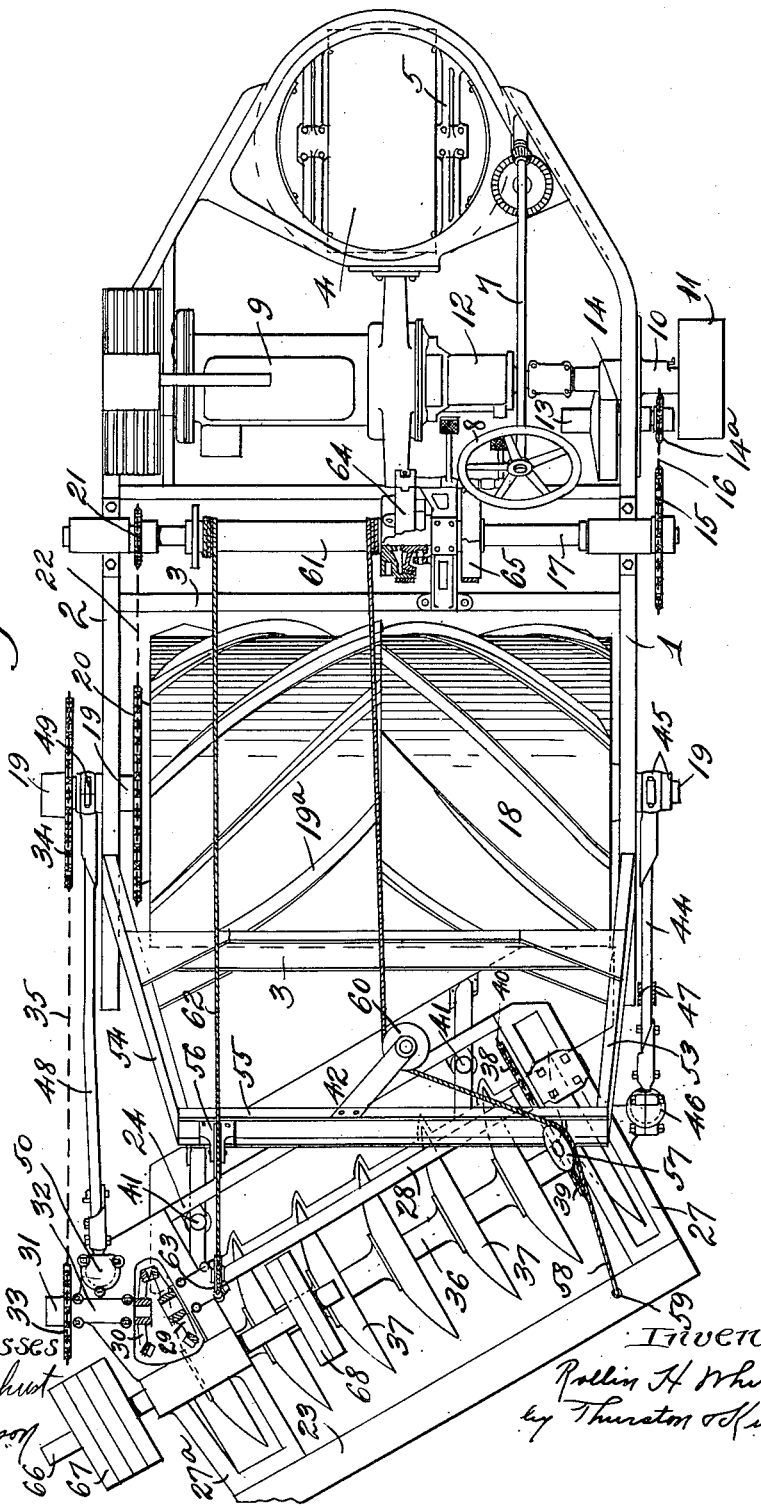

R. H. WHITE.
AGRICULTURAL MACHINE.
APPLICATION FILED AUG. 14, 1914.

1,269,028.

Patented June 11, 1918.
4 SHEETS—SHEET 1.

Witnesses
E. B. Filchut
A. J. Hudson

Inventor
Rollin H. White
by Thurston & Kwis
attys

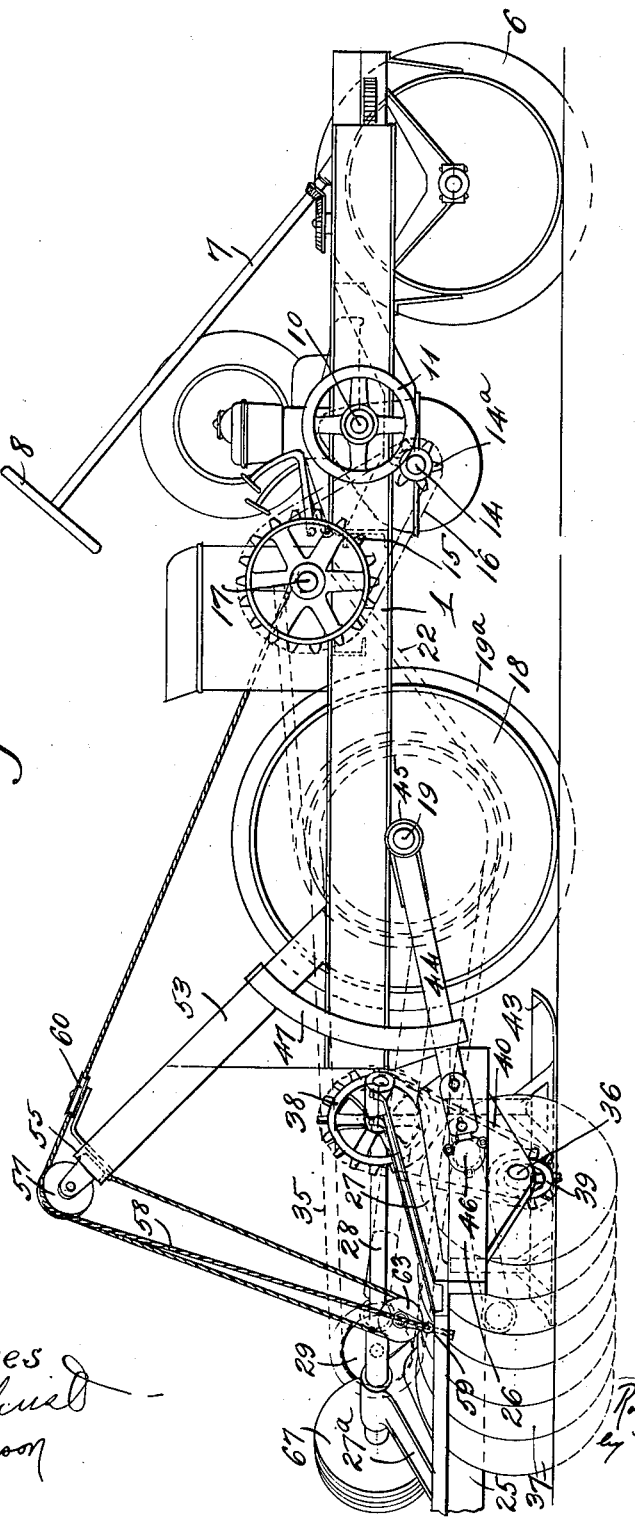

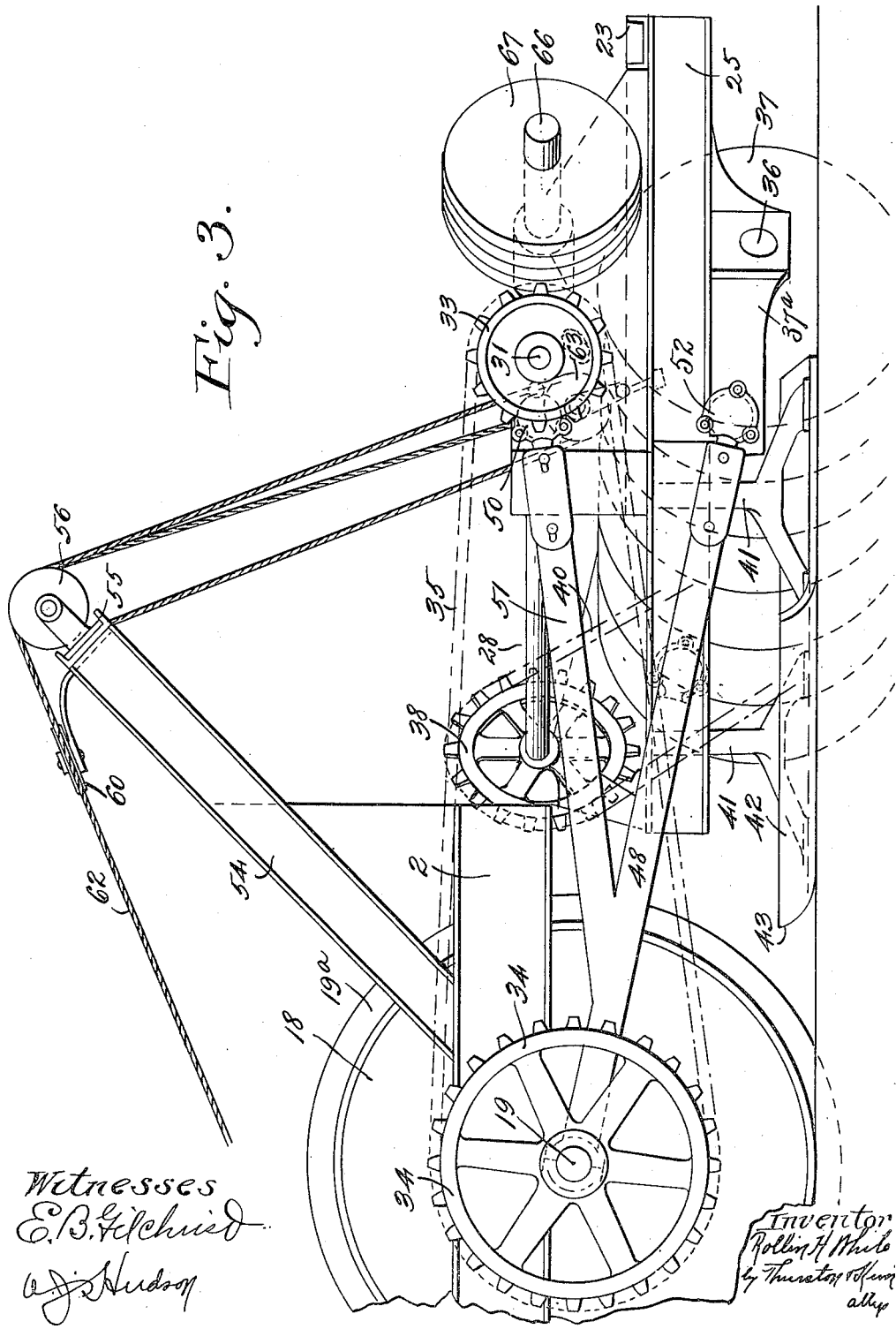

R. H. WHITE.
AGRICULTURAL MACHINE.
APPLICATION FILED AUG. 14, 1914.
1,269,028.
Patented June 11, 1918.
4 SHEETS—SHEET 4.
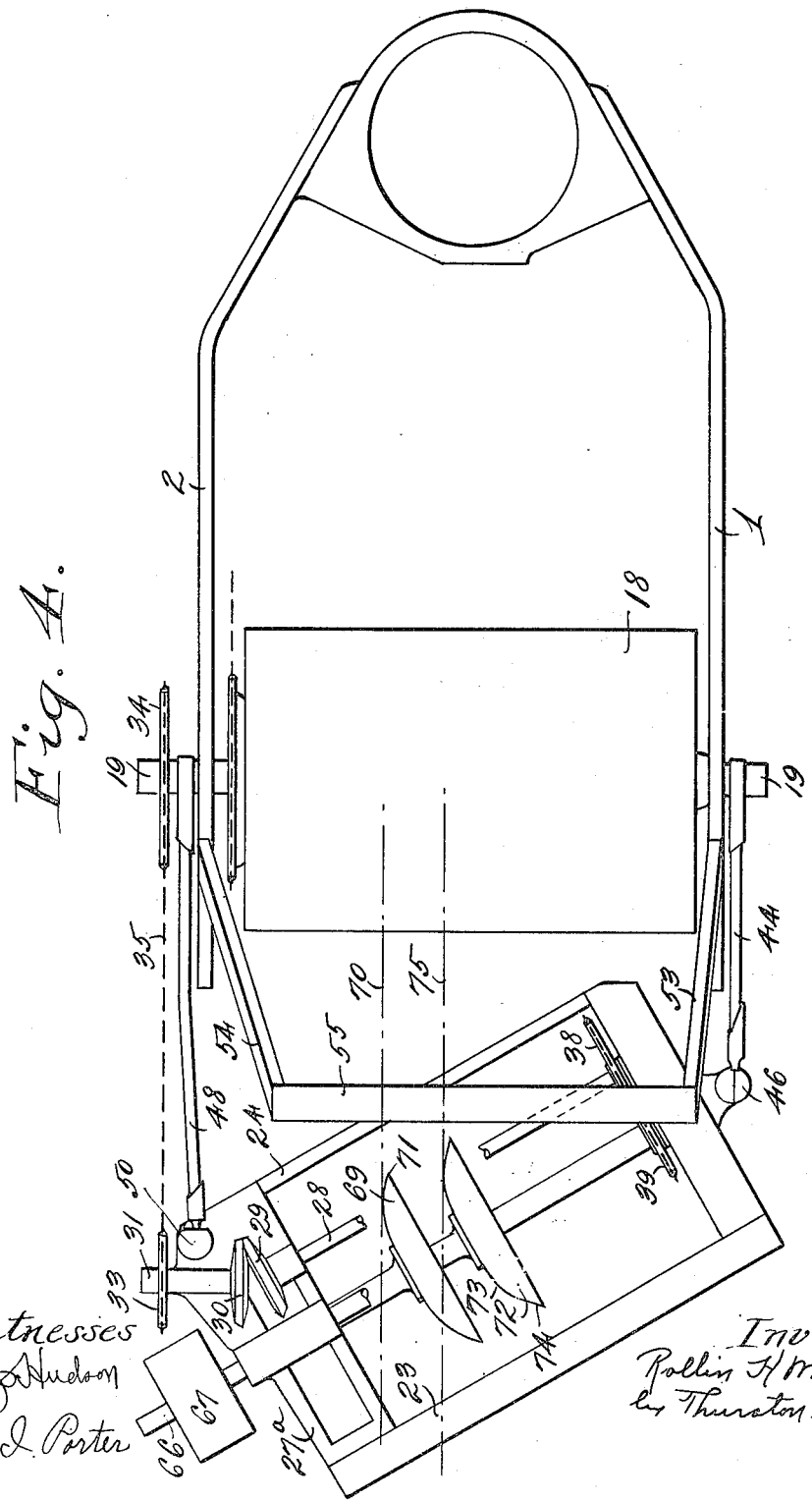

UNITED STATES PATENT OFFICE.

ROLLIN H. WHITE, OF SOUTH EUCLID, OHIO, ASSIGNOR, BY DIRECT AND MESNE ASSIGNMENTS, TO THE CLEVELAND TRACTOR COMPANY, OF EUCLID, OHIO, A CORPORATION OF OHIO.

AGRICULTURAL MACHINE.

1,269,028.　　　　　Specification of Letters Patent.　　Patented June 11, 1918.

Application filed August 14, 1914.　Serial No. 856,741.

*To all whom it may concern:*

Be it known that I, ROLLIN H. WHITE, a citizen of the United States, residing at South Euclid, in the county of Cuyahoga and State of Ohio, have invented a certain new and useful Improvement in Agricultural Machines, of which the following is a full, clear, and exact description.

This invention relates to agricultural machines which are driven under their own power and in which the implements which work upon the soil are driven.

Generally speaking, the invention may be said to comprise the elements and combinations thereof set forth in the accompanying claims.

Reference should be had to the accompanying drawings forming a part of this specification, in which Figure 1 is a top plan view of the machine of my invention. Fig. 2 is a side elevation of the machine; Fig. 3 is a side elevation of the machine opposite to that shown in Fig. 2; and Fig. 4 is a diagrammatic plan view showing certain arrangements of the soil engaging disks.

The chassis of the machine comprises side members 1 and 2 and transversely extending members 3, these members being secured in the usual manner. At their forward ends the side members of the chassis are bent inwardly, and at this portion support an upper table 4 which in turn supports a lower swiveled table 5 upon which the front wheel or roller 6 is mounted. The lower table 5 is suitably geared with a steering post 7 which may be turned by a steering hand wheel 8.

Extending transversely of the chassis is a motor 9, and the motor drives a power shaft 10 which carries a fly wheel 11 at the end thereof. Between the power shaft and the motor is change speed mechanism indicated at 12.

The shaft 10 is, through suitable means, geared to a shaft 13 which, by a suitable clutch, may be connected to a shaft 14 which carries a gear 14ª. The gear 14ª is in line with a gear 15, and the two gears are operatively connected by a sprocket chain 16.

The gear 15 is carried upon a shaft 17 which extends transversely of the chassis and is supported by suitable bearings mounted upon the chassis.

Adjacent the rear end of the chassis is a traction roller 18. This roller is provided with an axle 19 with its adjacent opposite ends mounted upon the chassis. The cylindrical surface of the roller is provided with ribs 19ª which afford traction.

A gear 20 is mounted at one end of the roller 18, and this gear is in line with a gear 21 carried upon shaft 17. The two gears just mentioned are connected by a sprocket chain 22.

To the rear of the chassis there is a transversely extending frame which may be termed the implement frame, inasmuch as it carries the implements which engage the soil to work it.

The implement frame comprises side members 23 and 24 which are joined by end pieces 25 and 26. At opposite ends of the implement frame there are brackets 27 and 27ª, with angularly disposed legs, these legs being supported upon and secured to the side pieces of the implement frame. At the juncture of the legs of the brackets 27 and 27ª are journals which provide bearing for a shaft 28.

The shaft 28 at one end is provided with a gear 29 which meshes with a gear 30. These gears are bevel gears and permit an angular driving relation between the gears. Gear 30 is mounted at one end of a shaft 31 which is mounted in a bearing 32 that may form part of the bracket 27ª. To one end of the shaft 31 is attached a gear 33 which alines with a gear 34 which is attached to a portion of the axle of the traction roller that extends beyond the chassis frame. The gears 34 and 33 are operatively connected by a sprocket chain 35.

Below the implement frame there extends a shaft 36 upon which are secured the disks 37, or other implements which work upon the soil. The shaft 36 is journaled upon hangers 37ᵇ and 37ª which depend from the side pieces 26 and 25, respectively.

Upon the shaft 28 there is a gear 38, and upon the shaft 36 there is a gear 39, the last mentioned gears being in alinement and are operatively connected by means of a sprocket chain 40,—thus establishing a driving relationship between the shaft 28 and the shaft 36, whereby disks 37 are driven.

Upon the side member 24 of the implement frame are upright posts 41 which are adjustably secured, and at their lower ends these posts are secured to a shoe 42. This shoe is preferably rounded upward at its forward end, as indicated at 43 in Fig. 3. The shoe 42 is adapted to rest upon the ground, and holds the implement frame at a definite adjusted distance above the ground. The adjustment of the shoe 42 determines the depth to which the disks 37 may cut into the soil.

The implement frame is spaced with relation to the chassis frame at one side by means of a space member 44. This member is shown in elevation in Fig. 2. At one end the spacer member is secured upon the axle of the traction roller by means of a hinge joint 45, and at its opposite end the member 44 is secured to the side member 26 of the implement frame by means of a ball and socket joint indicated at 46.

Secured upon the side member 1 of the chassis are arc shaped straps 47 which extend above and below the chassis frame. These straps are spaced a slight distance apart and between them receive the member 44 to guide it in its movement up and down, but limit the side thrust of the member 47, and consequently, the side thrust of the whole implement frame.

Upon the opposite side of the machine the implement frame is spaced from the chassis frame by a rod 48, which is hinged upon the axle of the traction roller 18 by a hinge joint indicated at 49. This hinge joint is permitted to have a certain amount of play so as to accommodate a limited turning movement of the rod 48. At its opposite end the rod 48 is connected by a ball and socket joint indicated at 52 with the bracket 37ª which depends from the side member 25 of the implement frame. From the rod 48 there extends a second rod 51 which is rigidly secured to the rod 48 at one end, and at its opposite end is secured by means of a ball and socket joint indicated at 50 upon one of the brackets 27 which support the shaft 28.

The rod 48 and the rod 51 form a Y connection between the chassis and the implement frame, two points of connection being upon the implement frame and one point with the chassis. This form of spacing member, involving as it does three points of connection between the chassis and implement frame, substantially prevents any torsion of the implement frame about its longitudinal axis and all the stresses and strains are equalized due to this Y connection.

It will be seen from the construction just described that the implement frame is flexibly jointed to the chassis frame, furthermore there is a limited amount of turning movement of the spacer rods themselves, which is permitted by the limited flexibility of the material of which the spacer rods are made so that it will appear that the opposite ends of the implement frame may have a certain amount of independent movement and a limited amount of side thrust, so that it may accommodate itself to stresses and strains incident to the disks 37 cutting through the soil.

It is desirable and necessary to raise the implement frame from the ground when the machine is turning at the end of a plowed track, as well as to keep the disks off of the ground when the machine is taken to and from the work. For this purpose I have provided a mechanism for raising and permitting the lowering of the implement frame.

Upon the side members 1 and 2 there are secured diagonally upward extending side members 53 and 54 which, at their upper ends, are joined by a cross member 55. These side members 53 and 54 are secured to a transverse member 3 of the chassis frame by any suitable means, so that the members 53, 54 and 55 form a rigid structure which I term a hoisting frame and support sheaves 56 and 57. Over the sheave 57 there runs a cable 58 which, at one end, is secured to the implement frame, as indicated at 59, thence passes over the sheave 57 and over a second sheave 60 and the free end is wound several turns upon a drum 61.

A second cable 62 is secured upon the cross member 55, passes around a sheave 63, which is mounted upon the implement frame, passes over the sheave 56, and is wound a number of turns around the drum 61.

This drum 61 is mounted upon but normally unattached to the shaft 17. A clutch mechanism, generally indicated at 64 is provided, whereby the shaft 17 may be clutched to the drum 61 to cause the same to turn and wind the cables 58 and 62 upon the drum, which will result in raising the implement frame from off the ground. A brake mechanism 65 is provided so that when the implement frame has been lifted from the ground to a desired height, the brake mechanism 65 may be set and the clutch 64 released. Subsequently when the brake 65 is released, the implement frame may be lowered to the ground.

It becomes desirable at times to weight the implement frame, and for this purpose I have shown a short shaft 66, which is mounted in the bracket 27. This shaft extends upon opposite sides of the bracket 27 and is adapted to have secured thereto weights which are indicated at 67 and 68. Obviously, these weights may be adjusted to accomplish the most desirable result.

The disks are so mounted that their axes of rotation are at an angle with respect to the direction of travel of the machine as a whole. This then results in the disks cutting in a direction which is at an angle with respect to the direction of travel of the machine as a whole.

Furthermore, the shape of the disk is so chosen, and its angle of cutting with respect to the soil is so chosen that there will be exerted on the disk by the cutting of the disk through the soil a back pressure which will counterbalance the thrust produced upon the disk by the turning over of the soil into the furrow by the disk.

In Fig. 4 I have shown upon the same operating shaft in diagrammatic manner, two disks which are so mounted that they will fulfil the requirements just mentioned. It will be understood that a plurality of disks will in practice be used.

The disk 69 is a convex disk so fashioned and mounted with respect to the cutting of the soil through which it passes, that a line such as represented at 70, parallel with the direction of travel of the chassis will be tangent to the surface of the disk at a point on the convex surface, which is back of the cutting edge represented at 71. The portion of the disk between the point of tangency of the line 70 and the cutting edge 71 will therefore receive a thrust or pressure as it cuts into the solid soil, which will be in a direction opposite to that thrust which is produced by the turning over of the soil upon the opposite face of the disk.

The amount of the surface of the disk which is thus subjected to the back pressure, will be chosen so that the back pressure or thrust will equal the thrust due to the turning over of the soil into the furrow, and thus neutralize any tendency for the chassis to be deflected from its intended course by the turning movement produced as the soil is turned over by the disk.

There are various forms, which disks may assume to fulfil these requirements, and while I do not here intend to try to set forth all the forms, I have shown at 72, another form of disk which will accomplish the same results as the disk 69. This disk is provided with a convex portion 73 and a conical portion 74. The disk is so mounted upon its shaft that a line such as 75 parallel with the direction in which the chassis is moving will be tangent to the convex portion of the disk at the point where the conical portion 74 of the disk intersects the convex portion of the disk. The disk will therefore present a surface represented by the conical portion 74, which will exert a back thrust or pressure upon the disk, and the extent of this surface is such that the back thrust will equal and neutralize the thrust produced by the turning over of the soil as the disk cuts into the soil.

The features just described are of considerable importance, as they enable the machine to be steered easily and eliminate the necessity for any thrust roller which is a common expedient.

While I have shown and described the implement frame as equipped with plowing disks, it is obvious that harrowing disks may be substituted for the plowing disks, and I consider it within the range of my invention to employ any implements which work upon the soil.

The details of construction of the machine may be changed without departing from the spirit of my invention.

Having thus described my invention, what I claim is:

1. In an agricultural machine, the combination with a chassis of a motor thereon, traction means including a traction roller upon which the chassis is mounted, an implement frame behind the chassis, a spacer means between one side of the chassis and the implement frame, a three point spacer means between the other side of the chassis and implement frame, and driving connections between the motor and traction roller.

2. In an agricultural machine, the combination with a chassis of a motor thereon, traction means including a traction roller upon which the chassis is mounted, an implement frame behind the chassis, a spacer means between one side of the chassis and a side of the implement frame, said spacer means being flexibly connected with the implement frame, a three point spacer means between the other side of the chassis and of the implement frame, two points of the spacer means being flexibly connected with the implement frame and driving connections between the motor and traction roller.

3. In an agricultural machine, the combination with a chassis, traction means upon which the chassis is mounted, a motor, driving connections between the motor and roller means, an implement frame behind the chassis frame, ground engaging means carried by the said frame, a spacer means flexibly connected with one end of the frame and hingedly connected with the chassis, a second Y shaped spacer means connected to the other end of the implement frame and chassis, the two points of the spacer being flexibly connected with the chassis frame and the remaining point of the spacer being hingedly connected with the chassis.

4. In an agricultural machine, the combination with a chassis of a motor mounted thereon, traction means upon which the chassis is mounted, an implement frame behind the chassis, a spacer means between one side of the chassis and of the implement frame, said spacer means being flexibly connected with the implement frame, a three point spacer means between the other side of chassis and of the implement frame, two points of said spacer means being flexibly connected with the implement frame at two points, one or more soil engaging disks mounted upon the implement frame, a flexible driving connection between the disks and the motor and driving connections between the motor and roller means.

5. In an agricultural machine, comprising a chassis, a motor mounted thereon, roller means including a traction roller upon which the chassis is mounted, an implement frame behind the said chassis, the axis of said implement frame extending at an angle with respect to the axis of the chassis, spacing means hingedly mounted at one end upon the chassis, said spacing means engaging both ends of said implement frame by a universal connection and means carried by the chassis for limiting side movement of the said spacing means, but permitting vertical movement thereof.

6. In an agricultural machine, the combination with a chassis, a motor mounted thereon, traction means including a traction roller upon which the chassis is mounted, an implement frame, ground engaging implements carried by the frame, a spacer rod connection between one end of the frame and the chassis, said rod being hingedly connected with the chassis and having a universal connection at its opposite end with the implement frame, a second spacer rod hingedly connected with the chassis frame, and having a universal connection with the opposite end of the implement frame, and means carried by the chassis limiting side movement of the implement frame, but permitting vertical movement.

7. An agricultural machine, comprising a chassis, a motor mounted thereon, rollers upon which the chassis is mounted, including a traction roller, an implement frame at the rear of said chassis, a spacing rod hingedly connected to the chassis frame at one end, and at its opposite end flexibly connected with one end of the implement frame, a second spacing rod hingedly connected at one end with the chassis frame, means universally connecting the opposite end of the last mentioned rod with an end of the implement frame, and a guiding means comprising a member having a substantially vertical slot, through which slot the last mentioned spacing rod extends.

8. In an agricultural machine, the combination with a chassis, a motor supported by the chassis, rollers including a traction roller upon which the chassis is mounted, an implement frame, spacing means hingedly mounted upon the chassis, said spacing means having a universal connection with both ends of the implement frame, means carried by the chassis for limiting side movement of the implement frame, earth engaging implements carried by the implement frame, means for driving said implements including a driving shaft carried by the implement frame, a gear operatively connected with said driving shaft, said gear being mounted upon the implement frame, adjacent an end thereof, and operative connections between the said gear and the motor.

In testimony whereof, I hereunto affix my signature in the presence of two witnesses.

ROLLIN H. WHITE.

Witnesses:
A. J. HUDSON,
L. I. PORTER.